United States Patent [19]
Mims et al.

[11] Patent Number: 5,086,843
[45] Date of Patent: Feb. 11, 1992

[54] OIL TOOL RELEASE JOINT

[75] Inventors: Michael G. Mims, Bakersfield; Mark D. Mueller, Santa Maria, both of Calif.; Frank L. Jones, Balikpapan, Indonesia; Michael J. Bunyak, Santa Maria, Calif.

[73] Assignee: Union Oil Company of California, Los Angeles, Calif.

[21] Appl. No.: 589,321

[22] Filed: Sep. 27, 1990

[51] Int. Cl.⁵ .................. E21B 17/06; E21B 19/16; E21B 23/02

[52] U.S. Cl. .................... 166/380; 166/381; 166/208; 175/294; 175/320

[58] Field of Search ............. 166/208, 242, 168, 380, 166/381, 382, 117, 123; 175/294, 320, 321

[56] References Cited

U.S. PATENT DOCUMENTS 4,064,953 12/1977 Collins .................. 175/294 X
4,611,662 9/1986 Harrington .................. 175/320 X
4,856,591 8/1989 Donovan et al. .................. 166/380 X

*Primary Examiner*—William P. Neuder
*Attorney, Agent, or Firm*—Gregory F. Wirzbicki; William O. Jacobson

[57] ABSTRACT

An oil tool release joint with a top sub that has a pin end which inserts into an opening in a bottom sub provides an alternative remote tool for separating pipe string segments after rotation. The subs are held together by shear pins which are wedged through holes in the bottom sub into recesses in the top sub. The bottom sub has uphole extending splines that engage slots in the top sub when the subs are connected. The splines and slots translate rotational motion from one sub to the other. The joint releases upon the application of a force sufficient to shear the shear pins either by hydraulic pressure in the drill string, an upward pull on the top sub or both. A guide ring encircles the uphole ends of the splines to guide material into the bottom sub when the joint is separated.

49 Claims, 4 Drawing Sheets

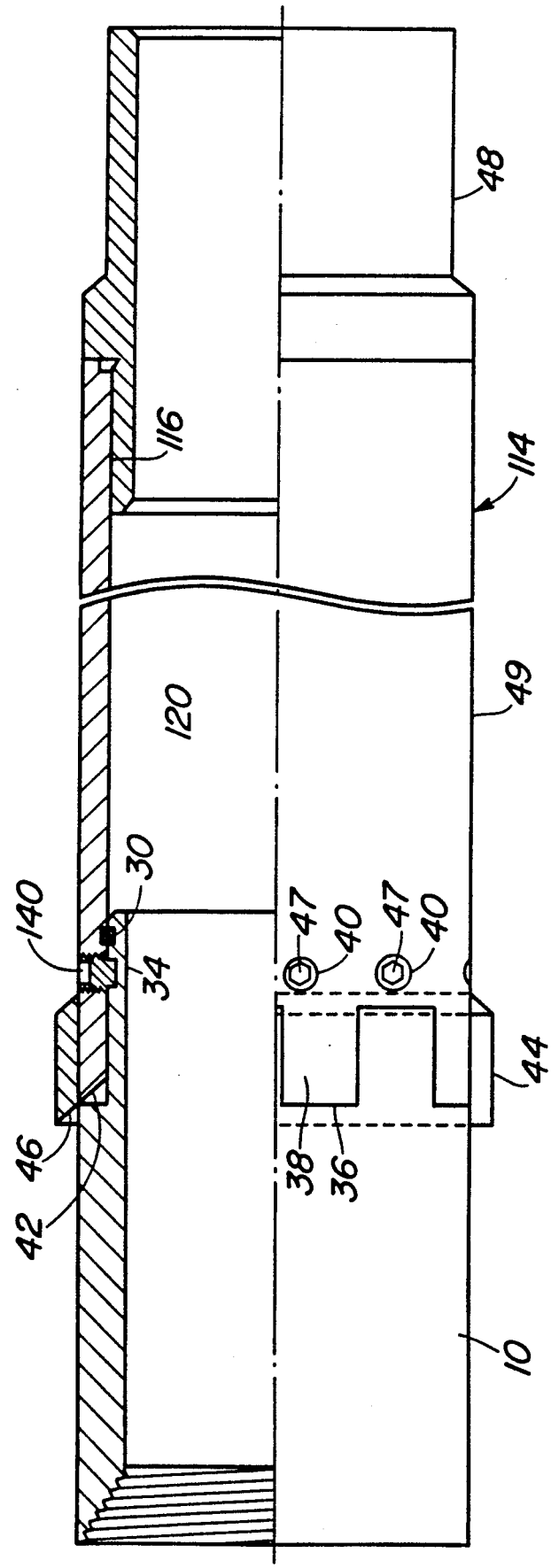

OIL TOOL RELEASE JOINT

FIELD OF THE INVENTION

The present invention relates to the field of oil tool release joints and in particular to a tool which releases a downhole component from a drill string in response to changes in hydraulic pressure in the drill string.

BACKGROUND OF THE INVENTION

In the drilling of oil wells, a drill bit and drill string is used to drill a well hole. After the well hole is drilled, a liner (or casing) may be run across the productive interval by using the drill pipe. With the liner in place, a cement slurry is pumped down through the drill pipe, through the liner, and into an annulus between the liner and a casing in the well hole to cement the liner in place and to keep production fluids in the liner.

Quite often well holes are not completely vertical. They can have substantial horizontal components. Wells with substantial horizontal components are called high angle extended reach wells. Running the liner through high angle extended reach well holes can be difficult because of friction between the liner and the well hole wall caused by the weight of the liner against the wall. Translational friction can be substantially reduced by rotating the liner while it is being run into the well hole.

The tools that have run liners into extended reach well holes have not generally rotated the liners while they were being run in due to the high torque required for rotation, although the tools permit liner rotations after run-in. Rotation is typically used to release the tools from the liners once the liners are in place. Consequently, it has not been possible to rotate the liners to reduce frictional drag when release-by-rotation tools are used.

U.S. patent application Ser. No. 418,510, filed Oct. 10, 1989, discloses a hydraulic release oil tool which avoids these problems with existing release tools. This application is assigned to the assignee of the present invention and is incorporated herein fully by this reference. The tool described in that application allows the liner to be rotated in either direction as it is run into the well hole, and it releases the liner upon application of hydraulic pressure in the drill string. It is preferred to provide a safety joint as a backup for the primary release joint. In the event that the primary release joint fails to operate, the safety joint can be used to separate the liner. The present invention is particularly suited for use as a backup safety joint in connection with the hydraulic release oil tool of U.S. patent application Ser. No. 418,510, filed Oct. 10, 1989, when rotation is desired. It can also be used independently or as a primary release tool in its own right.

SUMMARY OF THE INVENTION

The present invention provides a release tool for use with pipe strings. The tool translates rotational motion in either direction from a drill or other pipe string to the downhole components to which it is connected and releases upon application of one or more forces, such as hydraulic pressure and upward pulls. The forces can be combined, or used separately to release components of the tool.

In one embodiment, the invention encompasses a release tool with a top sub for coupling to a drill or other pipe string and a bottom sub for coupling to a downhole tool. The top and bottom subs have a longitudinal axis and bores substantially along the longitudinal axis. The bottom sub is connectable to the top sub so that the top and bottom sub bores are substantially aligned. The tool also has means on each sub for transmitting motion rotational about the longitudinal axis from the top sub to the bottom sub, and means for retaining the subs in connection with each other and for releasing the subs from each other upon the application of a force pulling the subs apart which is greater than a predetermined force. The means for transmitting rotational motion preferably includes a plurality of splines on one of the subs extending substantially parallel to the sub's longitudinal axis, and a plurality of slots on the other one of the subs extending substantially parallel to the same axis. The slots receive the splines when the subs are connected to transmit rotational motion. The means for retaining the subs preferably includes shear pins extending into the two subs, the shear pins shearing upon the application of hydraulic pressure greater than the predetermined pressure, or upon an upward pull on the drill string, or both.

The connected subs form a substantially straight axial bore which allows fluid, other tools and pressure to freely pass. The splines and slots allow rotational forces to be transmitted between the subs without unscrewing or releasing any portion of the release tool. Since the release tool releases upon the application of hydraulic pressure, an upward pull, or both, the tool can be rotated or released independent of other tools which respond to axial rotation.

BRIEF DESCRIPTION OF THE DRAWINGS

These and other aspects of the invention will be more fully understood by referring to the following detailed description and the accompanying drawings wherein:

FIG. 4 shows an alternative oil tool release joint assembled and in half-section.

DETAILED DESCRIPTION

Figure 1:
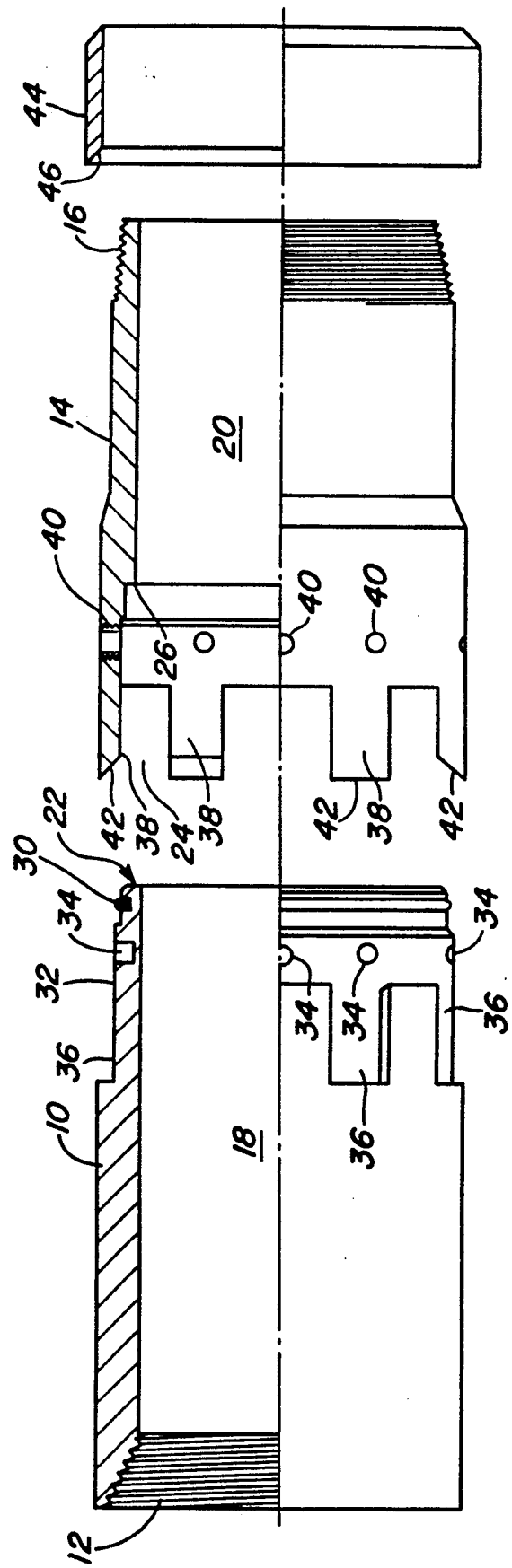
FIG. 1 shows an oil tool release joint exploded and in half-section.

The oil tool release joint of the present invention is particularly well suited for use as a setting and release tool in running a liner down a well hole and will be described primarily in that context. However, it can also be used in many other drilling procedures. The release tool has a top sub or running head 10 with threads 12 at its uphole end for screwing the top sub onto a coupling, running tool, or a work string, and a bottom sub or setting assembly 14 with threads 16 for screwing the bottom sub onto some downhole duct-like segment or component, for example, a liner. Both subs are elongated along their own longitudinal axes and have longitudinal bores 18, 20 along those axes. The subs are constructed so that when the two subs are joined together there is an open passageway extending from the pipe string threads on the top sub down through the downhole component threads on the bottom sub. This is particularly important, for example, in running in a liner because it allows cement to flow through the pipe string, past the release tool, and into the liner. Preferably the longitudinal axes are substantially aligned coincident to each other when the subs are connected.

The top sub has a pin end 22 opposite the threads 12 which is insertable into an opening 24 in the bottom sub. The bottom sub opening is at the end of the bottom sub opposite the downhole component threads. The pin end of the top sub has a short, smaller-diameter section at its extreme end which extends into the opening and is adapted to meet a shoulder 26. When the top and bottom subs are pushed together this shoulder locates the top sub in its proper position within the opening of the bottom sub. Encircling the outside of the extreme end of the top sub is a packing, gasket or O-ring 30 to prevent fluids from leaking between the inside and the outside of the open passageway. Past the packing 30, the pin end has a larger outside diameter main portion 32 with a discontinuous ring of eight recesses 34. These recesses are preferably spaced equidistant around the outer circumference of the top sub and are adapted to receive shear pins. Past the recesses are a set of slots 36. These slots are also spaced equidistant around the outer circumference of the pin end of the top sub. The number of slots and shear pins can be altered depending upon the particular application and the stresses involved.

The bottom sub 14 opening 24 is adapted to receive the pin end of the top sub 10 which extends into the opening in the bottom sub until it butt up against the shoulder 26. The shoulder allows the joint to withstand very high forces pushing the two subs together, i.e., compressive forces, without stressing the shear pins. Such compressive forces can arise from the weight of the upwell pipe string and in many other ways. The bottom sub has a set of splines 38 which fit into the slots 36 on the top sub. These splines have walls extending radially away from the center of the bottom sub, which butt against similar radially extending walls on the slots so that when the top sub is rotated, the walls of the slots push against the walls of the splines and force the bottom sub to rotate as well. The bottom sub can be rotated in either direction by rotating the top sub independent of tensile or compressive forces on the subs.

The shape of slots 36 and splines 38 can be altered. If the radial dimensions of each spline 38 are reduced, while maintaining the location of one of the slot abutting surfaces, rotation in one direction may be accomplished without relative rotation between bottom and top subs. Alternative mating shapes of splines 38 may include triangular and trapezoidal. These alternative shapes can allow uni- or bi-directional rotation if longitudinal separation of subs 10 and 14 is restrained.

Although alternative spline shapes may allow a portion of some rotational forces to contribute to rupturing the shear pins 47 (see FIG. 2), the majority of the force required to rupture the shear pins 47 must be supplied by axial forces if abutting surface angles with respect to the longitudinal axes are small. Typically, these are created by hydraulic pressure and by pulling on the pipe string. The splines and slots can also be provided with abutting horizontal surfaces at their ends. The splines and slots can then withstand compressive forces in the same way that the shoulder and pin end do.

The bottom sub also has a series of threaded holes 40 equidistantly spaced apart around its circumference. When the top sub is inserted into the bottom sub so that the pin end rests against the shoulder on the bottom sub, the holes are aligned with the recesses in the top sub. This allows threaded shear pins 47 (FIG. 2) to be screwed into the holes 40 and extend into the recesses 34 to hold the top and bottom subs together. The shear pins are shown with an Allen head, however, many different types of heads may be used to screw the pins into place. Because of the preferred shape and abutting location of splines and slots, rotational motion does not apply any stress to the shear pins. All of the rotational torque is transmitted through the splines and slots. The shear pins are stressed only by applying an axial force between the subs.

While the inside diameter of the opening of the bottom sub must be large enough to receive the pin end of the top sub, the remainder of the bottom sub preferably has an inside diameter which is substantially equal to that of the top sub. When the top and bottom subs are connected together, material moving through the two subs sees a smooth consistent inside diameter and does not hang up on the walls.

The bottom sub on its end opposite the threads 16 faces uphole when the tool has been run down a well and after the subs have been separated. In the illustrated embodiments, the ends of the splines 38 extend further uphole than any other portion of the bottom sub and present an upward pointing face around the rim of the opening to anything proceeding downhole, for example, wire lines, darts and tools. The faces 42 at the ends of the splines are preferably beveled at an angle toward the center of the bottom sub. This helps guide any materials in the well into the axial bore of the bottom sub. The rim of the bottom sub between the splines can also be similarly beveled.

Figure 2:
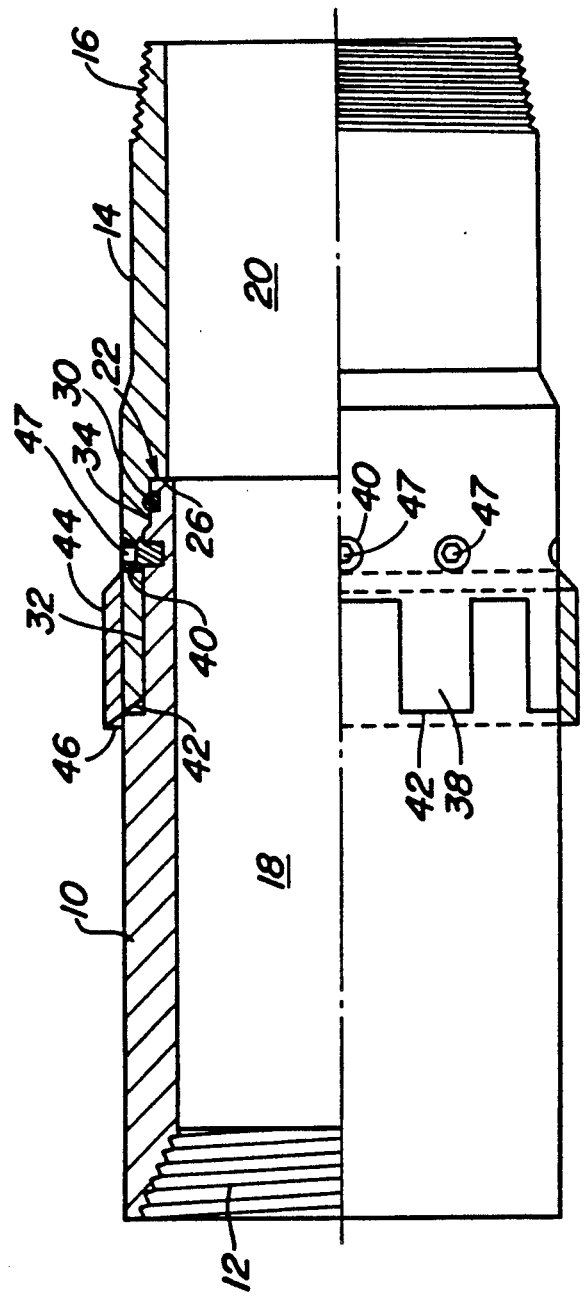
FIG. 2 shows the release joint of FIG. 1 assembled and in half-section.

The apparatus includes a guide ring 44. The guide ring is annular with an inside diameter large enough to encircle the bottom sub at the bottom sub opening. The guide ring is preferably welded in place around the bottom sub before the assembly is run downhole. The guide ring, like the rim of the opening of the bottom sub, has its own peripheral ring which faces uphole when the guide ring is in use and the top sub has been separated from the bottom sub. The uphole facing edge on this face is beveled like the edges of the splines toward the center of the longitudinal bore. This beveled face 46 combines with the beveled face 42 of the bottom sub to further guide tools into the axial bore of the bottom sub (FIGS. 2 and 4).

To assemble a pipe string using the release tool, the top sub pin end is inserted into the bottom sub so that it butts up against the shoulder within the opening of the bottom sub. The shear pins are then screwed into place through the holes 40 into the recesses 34 in the top and bottom subs, and the guide ring 44 is welded onto the bottom sub. The assembled release tool's top sub is then coupled to accompanying running assemblies or string and the bottom sub is screwed onto a downhole component, for example, a liner. Preferably, the top sub threads 12 are screwed onto a hydraulic release oil tool assembly such as that description in U.S. patent application Ser. No. 418,510, filed Oct. 10, 1989, which, in turn, is connected to a drill string so that the release tool of the present invention acts as a backup safety joint.

Figure 3:
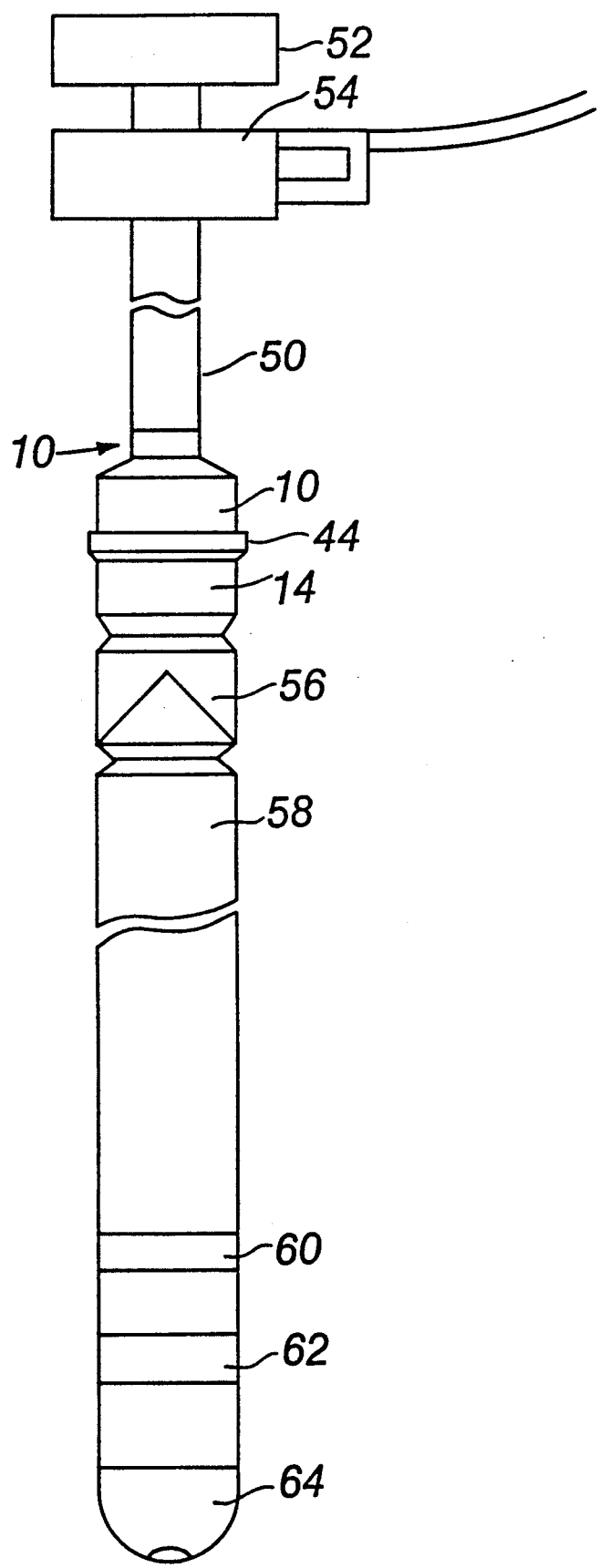
FIG. 3 illustrates schematically the use of the joint of the present invention.

FIG. 3 shows the apparatus required in a typical application of the present invention for running in a liner. In FIG. 3 the running head or top sub 10 of the release tool is coupled to a string of drill pipe 50 without an additional release tool. The drill pipe at the top of the well connects to a top drive power swivel 52 which drives the drill string into the well hole and a rotating cement head 54 which supplies cement for cementing in the liner. The bottom sub 14 is connected to a liner hanger 56 which anchors the liner against the larger or previously set casing. This connects serially to a liner 58, a landing collar 60, a float collar 62 and a float shoe 64 at the bottom of the downhole componentry.

Typically, in use, the liner and release tool are run down the well using the drill pipe string by rotating the liner and allowing gravity to push downward, i.e., creating compressive forces. If the well has portions with a significant horizontal component, then rotating the pipe string at the well head with the power swivel helps to significantly reduce the friction of the liner and pipe string against the sides of the well. Because of the spline and slot arrangement, the downhole components threaded onto the bottom sub can easily be rotated without stressing the shear pins. Once the liner reaches the desired position, the liner may be anchored into the well using conventional techniques. The liner is then cemented into place by running cement down the pipe string through the axial bores of the two subs and the liner. The cement is followed by a wiper dart which travels also through the top and bottom subs and lodges at the bottom of the liner. Drilling mud (not shown) is pumped through the pipe string behind the wiper dart (not shown) to push the wiper dart down the hole and drive the cement out around the liner. Once the wiper dart is in position, the pressure of the drilling mud supplied by a pump (not shown) is increased to operate the release tool. If a primary hydraulic release tool is used in conjunction with the release tool of the present invention, a moderate increase in hydraulic pressure should anchor the liner and then release the primary coupling tool and allow the pipe string to be removed. The release tool of the present invention remains in the well together with the bottom sub of the primary release tool.

If the primary release tool does not operate properly, or if the present invention is used as a primary release tool, then the release tool of the present invention is used to separate the drill string from the liner. First, the hydraulic pressure is increased in the pipe string. This tends to push the liner away from the drill string or, in other words, it tends to push the bottom sub axially away from the top sub. With enough hydraulic pressure the shear pins will shear and the top sub will be released from the bottom sub. A wiper dart can be used to seal off the pipe string below the release tool. This can aid in increasing the hydraulic pressure; however, it is not required. As the top and bottom subs separate further, the seal provided by the gasket 30 is broken and fluid leaks out toward the formation. This drop in hydraulic fluid pressure signals that the top and bottom subs have released and the top sub, together with the drill string, can be removed from the well. If adequate hydraulic pressure is not available, the hydraulic pressure can be complemented by pulling the top sub upwards. This can be done either by jarring or with a consistent upward pull. The bottom may be an anchored liner to increase the effectiveness of the pull. Alternatively, the inertia of the pipe string or its friction against the well hole can be relied upon to shear the shear pins and release the two subs. The top and bottom subs can also be released by pulling the top sub upwards in cases where an increase in hydraulic pressure is not desired, or possible. Once the top sub is removed, the guide ring together with the bottom sub guide any substances coming from uphole down into the bottom sub and from there into the liner (see FIG. 2).

FIG. 4 shows a second embodiment of a hydraulic release oil tool which incorporates a tie back sleeve. In this embodiment the top sub 10 and guide ring 44 are the same as those shown in FIG. 1. The bottom sub 114 is substantially elongated to include a tie back sleeve. While in the first embodiment the bottom sub has an opening with a larger inside diameter which is followed by a smaller diameter inside bore, the bottom sub 114 of FIG. 4 has no shoulder and no narrower passageway. The large inside diameter bore 120 of the bottom sub continues through to its very end where it has threads 116 to connect to a smaller diameter pin 48. The top sub must be positioned into the opening of the bottom sub without benefit of the shoulder; however, once the shear pins have been screwed into place, the top sub is securely positioned. The larger diameter tie back sleeve portion 49 of the bottom sub provides a surface into which a stinger can be stabbed in the event that a second liner is to be hung above the first liner using techniques known in the art.

The present invention has been described with reference to certain preferred embodiments. The scope of the attached claims, however, should not necessarily be limited to the described embodiments. The hydraulic release tool of the present invention can be used in a variety of different contexts. It is not limited strictly to running in a liner, but can be used in a drill string for variety of purposes. For example, during drilling if the leading end of the drill string were to get stuck in a well, the release tool can be used to remove the drill string. The splines and slots can be reversed so that the splines are carried on the top sub or so that the splines and slots are inside the bores of the subs. The pin and opening can be reversed also so that the bottom sub is inserted into the top sub. The guide ring can be eliminated, if desired.

What is claimed is:

1. A release tool for coupling pipe string segments comprising:
    (a) a top sub for coupling to a first pipe string segment, the top sub having a longitudinal axis and a bore substantially along the axis;
    (b) a bottom sub for coupling to a second pipe string segment, the bottom sub having a longitudinal axis and a bore substantially along the longitudinal axis, the bottom sub being connectable to the top sub so that the top and bottom subs are substantially aligned and said bores are capable of containing a fluid pressure;
    (c) a plurality of splines extending from one of the subs substantially parallel to the sub's longitudinal axis;
    (d) a plurality of slots on the other one of the subs extending substantially parallel to the other sub's axis, the slots receiving the splines when the subs are connected to transmit rotational motion about the longitudinal axis between the subs; and
    (e) means for preventing axial movement between the subs to retain the subs in connection with each other, the means capable of releasing to allow the subs to move axially away and disconnect from each other in the absence of rotational motion and an absence of an increase in fluid pressure in said subs.

2. The tool of claim 1 wherein the splines extend from the bottom sub and the slots are on the top sub.

3. The tool of claim 1 wherein said means for preventing is absent a shiftable element pressure actuated prior to said releasing and wherein the slots are on the outer surface of the respective sub.

4. A release tool for coupling pipe string segments within a subsurface hole comprising:
   (a) a top sub for coupling to a first string segment, the top sub having a longitudinal axis and a bore substantially along the longitudinal axis;
   (b) a bottom sub for coupling to a second downhole string segment, the bottom sub having a longitudinal axis and a bore substantially along the longitudinal axis, the bottom sub being connectable to the top sub so that the top and bottom sub bores are substantially aligned;
   (c) means on each sub for transmitting motion rotational about the longitudinal axis from the top sub to the bottom sub; and
   (d) means for retaining the subs in connection with each other and capable of releasing the subs from each other upon the application of a first force pulling the subs apart in the absence of a substantial increase in fluid pressure within said bore.

5. The tool of claim 4 comprising a shoulder within the opening for abutting the portion of the sub received in the opening, the shoulder preventing compression of the two subs together.

6. The tool of claim 4 wherein the transmitting means comprises:
   a plurality of splines on one of the subs extending substantially parallel to the sub's longitudinal axis; and
   a plurality of slots on the other one of the subs extending substantially parallel to the other sub axis, the slots receiving the splines when the subs are connected to transmit rotational motion about the longitudinal axis between the subs.

7. The tool of claim 4 wherein the second string segment comprises a liner hanger.

8. The tool of claim 4 adapted to be coupled between a liner hanger and a second release tool, the second release tool being coupled to the first pipe segment.

9. The tool of claim 4 wherein the retaining means releases the subs in response to an upward pull on the drill pipe string.

10. The tool of claim 4 wherein the retaining means releases the subs in response to a combination of hydraulic pressure in the bores of the subs and a pull exerted on one of the subs.

11. The tool of claim 4 wherein the retaining means comprises shear pins.

12. The tool of claim 11 wherein one of the subs extends into the other one of the subs when the subs are connected, the inner sub comprising recesses for receiving the shear pins and the other sub comprising holes for receiving the shear pins, the holes being aligned with the recesses when the subs are connected so that the shear pins extend through the holes and into the recesses without extending into the inner sub bore.

13. The tool of claim 4 wherein the bottom sub has a peripheral rim around the axial bore for facing uphole when the sub is in a well hole and wherein the rim has an uphole facing surface which is angled downhole and toward the axial bore.

14. The tool of claim 13 wherein a portion of said subsurface hole is nearly horizontal and said tool comprises a guide ring for encircling the bottom sub, the guide ring having an uphole facing surface for alignment with the bottom sub uphole facing surface, the guide ring surface encircling and covering said means for transmitting.

15. The tool of claim 4 wherein the bottom sub comprises a tie back sleeve.

16. The tool of claim 4 comprising means for sealing the axial bores of the top and bottom subs together.

17. The tool of claim 16 wherein the sealing means comprises a rubber O-ring.

18. A release tool comprising:
   (a) a top sub having a longitudinal axis, a bore substantially along the axis, and means for coupling the top sub to a drill string at one end of the axial bore, the other end of the bore comprising a pin;
   (b) a bottom sub having a longitudinal axis, a bore substantially along the axis, means for coupling the bottom sub to a downhole tool at one end of the bore, and an opening opposite the coupling means for receiving the pin end of he top sub opposite the coupling so that the axial bores of the subs are substantially aligned;
   (c) means for retaining the top sub pin end within the opening and capable of releasing the top sub pin end in response to hydraulic pressure in the bore and an axial force independent of said hydraulic pressure;
   (d) a plurality of axial splines on the bottom sub outside and proximate the opening and extending away from the coupling means; and
   (e) a plurality of axial slots on the top sub pin end for receiving the splines when the top sub pin end is within the bottom sub opening and for transmitting motion rotational about the longitudinal axis between the subs.

19. The tool of claim 18 wherein the downhole tool comprises a liner hanger.

20. The tool of claim 18 wherein the drill string comprises a second release tool.

21. The tool of claim 18 wherein the retaining means releases the subs in response to an upward pull on the top sub applied through the drill string.

22. The tool of claim 18 wherein the retaining means comprises shear pins extending through the bottom sub and into the top sub.

23. The tool of claim 22 wherein the top sub comprises recesses for receiving the shear pins, the recesses being sufficiently shallow to prevent the shear pins from entering the axial bore.

24. The tool of claim 22 wherein the top sub comprises recesses for receiving the shear pins, and the bottom sub comprises threaded holes for alignment with the recesses, the shear pins being adapted to be screwed into the threaded holes and project into the recesses.

25. The tool of claim 18 comprising a gasket for sealing the pin end of the top sub against the opening of the bottom sub to prevent fluids from passing into and out of the axial bores.

26. The tool of claim 18 wherein the bottom sub comprises a shoulder upon which the pin end of the top sub rests when the pin end is within the bottom sub opening.

27. The tool of claim 26 wherein the shoulder is adapted to prevent compressive forces between the two subs from being transferred to the shear pins.

28. The tool of claim 18 wherein the splines each have an end opposite the coupling means the ends having a face, the face being angled with respect to the longitudinal axis to guide material toward the opening.

29. The tool of claim 18 comprising a guide ring encircling the bottom sub and having a peripheral rim proximate the angled end faces, the rim having an angled face to guide apparatus toward the angled spline end faces.

30. The tool of claim 18 wherein the splines and slots extend axially along the bottom and top subs, respectively.

31. The tool of claim 30 wherein the splines and slots are adapted to prevent axial movement of the top and bottom subs toward each other.

32. A method of running in a liner in a well comprising:
(a) attaching a liner to a release sub of a setting and release tool and attaching the setting assembly of the setting and release tool to a drill pipe string forming a work string;
(b) running the liner into position in the well by rotating the work string and providing a force generally aligned along a well axis direction;
(c) after the liner is in the desired position anchoring the liner in the well; and
(d) releasing the release sub from the setting assembly by increasing the hydraulic pressure and applying an upwell force independent of said hydraulic pressure in the pipe string to separate the release sub away from the setting assembly.

33. The method of claim 32 wherein the release sub is connected to the setting assembly with shear pins and wherein the step of releasing the release sub comprises pushing the release sub away from the setting assembly to break the shear pins.

34. The method of claim 32 comprising running a wiper plug to the bottom of the liner before releasing the release sub.

35. The method of claim 32 wherein the release sub is connected to the setting assembly with shear pins and wherein the step of releasing the release sub comprises pulling the setting assembly uphole away from the release sub to break the shear pins.

36. A release tool for releasably coupling duct segments during insertion of coupled duct segments into a subsurface hole, said tool comprising:
a top sub and a bottom sub, each of said subs having a bore substantially along a longitudinal axis when the subs are coupled;
means for attaching a top bore end of said top sub to a first duct segment;
means for attaching a bottom bore end of said bottom sub to a second duct segment;
means for coupling unattached ends of said subs;
wherein said coupling means, when coupled, is capable of transmitting from said top end to said bottom end a rotational force and up to a pulling apart longitudinal force, wherein a majority of said pulling-apart force is substantially independent of said rotational force; and
wherein said coupling means is capable of releasing said subs from each other when said pulling-apart longitudinal force is applied to said subs in the absence of an increased fluid pressure in said bore.

37. A method of inserting a first duct segment into a hole using a releasably coupled tool having a bore along a longitudinal axis and also using a second duct segment, said method comprising:
(a) attaching a first duct segment end to a coupled tool end and a second segment end to a generally distal end of said coupled tool, said coupled tool bore and duct segments forming a fluid passageway;
(b) inserting said coupled segments into said hole;
(c) applying a tensile or compressive force to said coupled tool along said longitudinal axis during at least a portion of said inserting step, wherein said tensile force is less than a tensile limit value and said compressive force is less than a compressive limit value;
(d) applying a rotating force and rotating said coupled segments in a first rotational direction during at least a portion of said inserting step, wherein said rotating force is less than a rotating limit value; and
(e) after said inserting step, uncoupling said tool by applying a tensile force sufficient to longitudinally uncouple said segments, wherein the magnitude of said compressive limit value is larger than said tensile limit value and a majority of said tensile force is substantially independent of said rotating force and independent of fluid pressure in said fluid passageway.

38. The method of claim 37 which also comprises the steps of:
during said rotating step (d), flowing a first fluid at a first pressure from said fluid passageway to a space outside of at least one of said coupled duct segments within said hole;
flowing a cement slurry form said fluid passageway to said space after said first fluid flowing step and before said uncoupling step (3); and
affixing the location of said one segment relative to said hole before said uncoupling step (e).

39. The method of claim 38 which also comprises containing a second fluid within at least one of said duct segments during a portion of said rotating step (d), wherein the density of said second fluid is less than the density of said first fluid.

40. The method of claim 37 wherein said tensile force results, at least in part, from a second fluid pressure within said fluid passageway segments which is greater than said first pressure.

41. The method of claim 40 wherein said method uses, besides said coupled tool, at least one other means expected to releasably couple said segments, said method comprising the step of unsuccessfully attempting to uncouple said other coupling means before uncoupling step (e).

42. The method of claim 41 wherein said other uncoupling means is unsuccessfully attempted to be uncoupled by at least applying an intermediate fluid pressure less than said second fluid pressure and greater than said first pressure.

43. The method of claim 42 wherein said tensile force also results from pulling-apart longitudinal forces applied to one of said segments.

44. The method of claim 43 wherein a portion of said tensile force also results from rotational forces applied in a direction substantially opposite to said first rotational direction.

45. A release tool comprising:
(a) a top sub having a fluid passageway passing therethrough;
(b) a bottom sub having a fluid passageway passing therethrough;
(c) releasable coupling means for coupling the two subs together and allowing fluid at a first pressure in one of the two passageways to communicate with the other passageway, said coupling means being capable of transmitting axial forces between the two subs and being capable of uncoupling in the absence of a change in said first fluid pressure; and (d) transmitting means for transmitting rotational forces when said subs are coupled, wherein said transmitting means is substantially independent of said coupling means.

46. The tool of claim 45 wherein said transmitting means is not capable of transmitting substantial axial forces tending to pull apart said subs.

47. A method of inserting a duct segment into a subsurface hole, said segment generally having a longitudinal axis, said method comprising:

(a) attaching a first duct segment end to a first tool end of a releasable coupling tool having a bore, said coupling tool bore and duct segments forming a fluid passageway capable of containing up to a limiting fluid pressure sufficient to uncouple said tool from said segment in the absence of an axial tensile force;

(b) applying axial and rotating forces as required to insert said attached first tool end and first duct segment into said hole to a desired position;

(c) after reaching said desired position, uncoupling said tool by applying a tensile force to said first tool end sufficient to longitudinally uncouple said segments in the absence of said limiting fluid pressure.

48. The method of claim 47 which also comprises flowing a fluid under pressure through said fluid passageway and into said hole during at least a portion of said inserting step (b).

49. The method of claim 48 which also comprises increasing said pressure in said passageway during said uncoupling step (c).

* * * * *